US008595710B2

(12) United States Patent (10) Patent No.: US 8,595,710 B2
Aldahleh et al. (45) Date of Patent: Nov. 26, 2013

(54) REPOSITORIES AND RELATED SERVICES FOR MANAGING LOCALIZATION OF RESOURCES

(75) Inventors: Ayman Aldahleh, Redmond, WA (US); Javier L. Larrinaga, Redmond, WA (US); Anatoliy Burukhin, Issaquah, WA (US); Terry Farrell, County Dublin (IE)

(73) Assignee: Microsoft Corporation, Redmond, WA (US)

( * ) Notice: Subject to any disclaimer, the term of this patent is extended or adjusted under 35 U.S.C. 154(b) by 1189 days.

(21) Appl. No.: 12/041,620

(22) Filed: Mar. 3, 2008

(65) Prior Publication Data

US 2009/0222787 A1 Sep. 3, 2009

(51) Int. Cl.
*G06F 9/45* (2006.01)

(52) U.S. Cl.
USPC .......................................... 717/136

(58) Field of Classification Search
USPC .................................. 704/1–3, 8–9
See application file for complete search history.

(56) References Cited

U.S. PATENT DOCUMENTS

| | | | | |
|---|---|---|---|---|
| 5,903,858 | A * | 5/1999 | Saraki | 704/4 |
| 6,035,121 | A * | 3/2000 | Chiu et al. | 717/141 |
| 6,092,037 | A * | 7/2000 | Stone et al. | 704/8 |
| 6,496,793 | B1 * | 12/2002 | Veditz et al. | 704/8 |
| 6,567,973 | B1 * | 5/2003 | Yamamoto et al. | 717/136 |
| 6,910,068 | B2 | 6/2005 | Zintel et al. | |
| 6,983,238 | B2 * | 1/2006 | Gao | 704/8 |
| 7,178,142 | B2 | 2/2007 | Bennett et al. | |
| 7,509,318 | B2 * | 3/2009 | Shaath et al. | 1/1 |
| 7,552,452 | B2 * | 6/2009 | McHugh et al. | 719/331 |
| 7,607,085 | B1 * | 10/2009 | Lassesen | 715/264 |
| 7,716,641 | B2 * | 5/2010 | McHugh et al. | 717/124 |
| 7,721,271 | B2 * | 5/2010 | Pournasseh et al. | 717/137 |
| 7,761,849 | B2 * | 7/2010 | van Woerkom et al. | 717/120 |
| 7,797,151 | B2 * | 9/2010 | Apte et al. | 704/8 |
| 2002/0116172 | A1 | 8/2002 | Vargas | |
| 2003/0004703 | A1 * | 1/2003 | Prabhakar et al. | 704/8 |
| 2003/0126559 | A1 * | 7/2003 | Fuhrmann | 715/513 |
| 2004/0088370 | A1 | 5/2004 | Patel et al. | |
| 2004/0230416 | A1 * | 11/2004 | Ye et al. | 704/5 |

(Continued)

OTHER PUBLICATIONS

Kuhr, "Creating a Multilingual Scribble Application with the MS Resource Localization Toolset", Sep. 12, 1998.*
Kuhr, "Creating a Multilingual Scribble Application with the MS Resource Localization Toolset", Sep. 12, 1998, retrieved at<<http://www.codeguru.com/Cpp/misc/misc/article.php/c411>>, pp. 10.

(Continued)

*Primary Examiner* — Don Wong
*Assistant Examiner* — Daxin Wu
(74) *Attorney, Agent, or Firm* — Hope Baldauff, LLC

(57) ABSTRACT

Tools and techniques for repositories and related services for managing localization of resources are described herein. These repositories may include representations of resources provided in first human languages, representations of software products that may incorporate these resources; and representations of other human languages into which the resources are localized. The repositories may relate the resources to the software products and to the other human languages. Methods provided by these tools may receive the resources as provided in the first human languages, send the resources for localization into other human languages, and receive localized resources. The methods may convert the localized resources into binary representations, and build software products that incorporate the binary representations. The tools may also provide systems that include processors, suitable bus systems, and computer-readable storage media that contains the resource repository.

18 Claims, 7 Drawing Sheets

(56) References Cited

U.S. PATENT DOCUMENTS

| | | | |
|---|---|---|---|
| 2005/0050526 A1* | 3/2005 | Dahne-Steuber et al. | 717/136 |
| 2005/0066315 A1* | 3/2005 | Nguyen et al. | 717/136 |
| 2005/0102253 A1 | 5/2005 | Wu et al. | |
| 2005/0108433 A1* | 5/2005 | Wu et al. | 709/246 |
| 2005/0204332 A1 | 9/2005 | Krishnan et al. | |
| 2005/0240905 A1* | 10/2005 | Pournasseh et al. | 717/136 |
| 2006/0116864 A1* | 6/2006 | McHugh et al. | 704/2 |
| 2006/0117304 A1* | 6/2006 | Anastassopoulos et al. | 717/136 |
| 2006/0195831 A1* | 8/2006 | Bossom et al. | 717/162 |
| 2006/0225068 A1 | 10/2006 | Bennett et al. | |
| 2007/0245321 A1* | 10/2007 | Cosgrove et al. | 717/136 |
| 2008/0189096 A1* | 8/2008 | Apte et al. | 704/2 |
| 2009/0094609 A1* | 4/2009 | Burukhin et al. | 718/104 |
| 2009/0222787 A1* | 9/2009 | Aldahleh et al. | 717/101 |

OTHER PUBLICATIONS

McGowan, "Microsoft .NET Development Platform Internationalization", retrieved at <<http://download.microsoft.com/download/1/c/f/1cfa8051-c1e1-447b-8476-f8be6c14b1ef/21-dotNet_i18n_c.ppt>>.

"Resource Tuner 1.99", 2003-2007, Dev Direct Ltd., retrieved at <<http://www.devdirect.com/ALL/resourcetuner_PROD_00015421.aspx>>, pp. 2.

McGowan, "Microsoft .NET Development Platform Internationalization", downloaded Oct. 12, 2007 from http://download.microsoft.com/download/1/c/f/1_cfa8051-cl_el-447b-8476-fSbe6cI4bl_ef/21-dotNeU_18n_c.ppt, 40 pages.

"Resource Tuner 1.99", Dev Direct Ltd., downloaded Oct. 12, 2007 from http://www.devdirecl.com/ALUresourcetuner_PROD_00015421.asp, 2 pages.

* cited by examiner

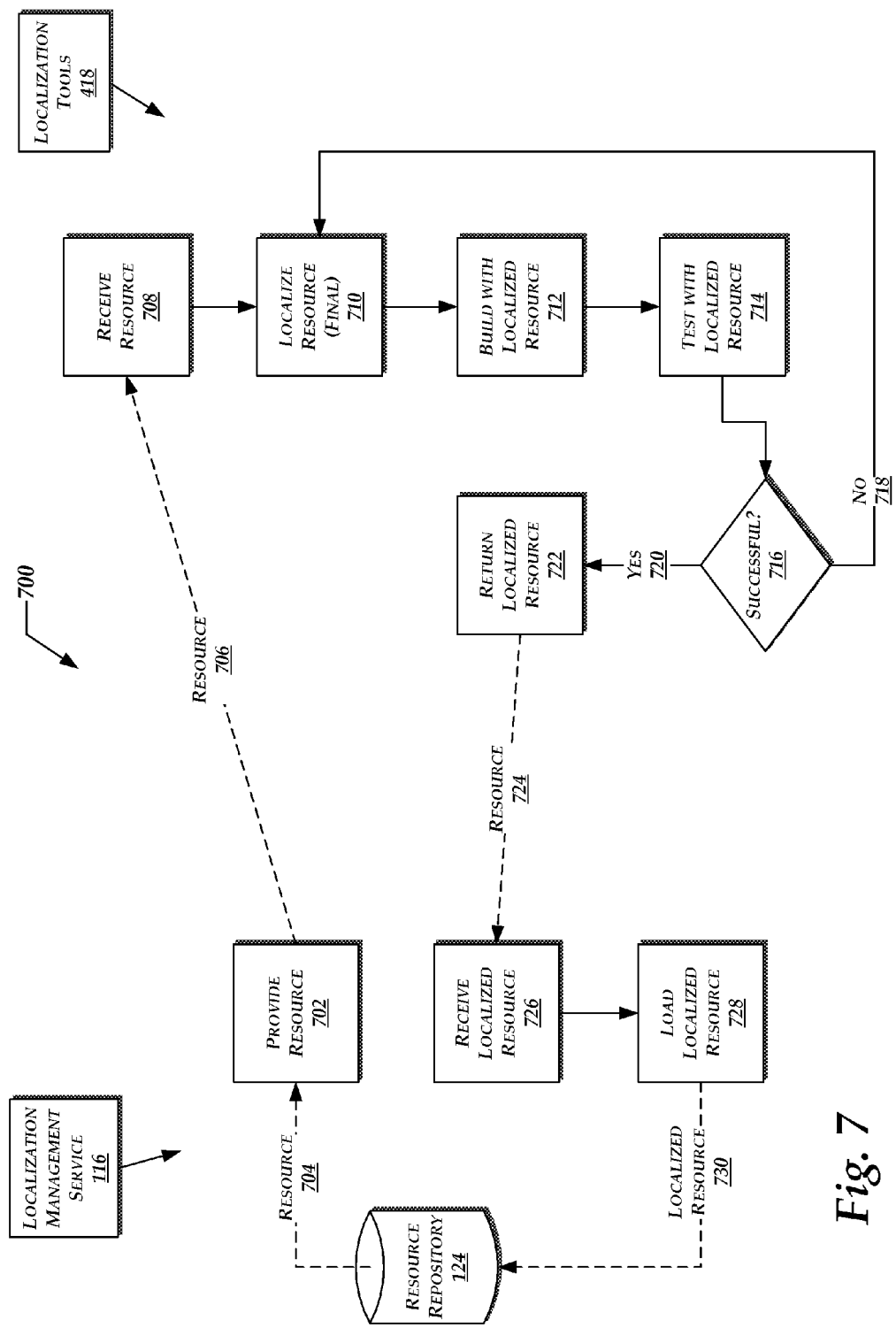

REPOSITORIES AND RELATED SERVICES FOR MANAGING LOCALIZATION OF RESOURCES

BACKGROUND

Software companies are increasing efforts to reach a variety of markets around the globe. In these different markets, users may speak a variety of different languages, and software products marketed to those users are typically localized to particular languages. In previous approaches, software was typically developed and released in a first language (e.g., English), and then localized as appropriate for different global markets.

SUMMARY

Tools and techniques for repositories and related services for managing localization of resources are described herein. These repositories may include representations of resources provided in first human languages, representations of software products that may incorporate these resources; and representations of other human languages into which the resources are localized. The repositories may relate the resources to the software products and to the other human languages. Methods provided by these tools may receive the resources as provided in the first human languages, send the resources for localization into other human languages, and receive localized resources. The methods may convert the localized resources into binary representations, and build software products that incorporate the binary representations. The tools may also provide systems that include processors, suitable bus systems, and computer-readable storage media that contains the resource repository.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a diagram illustrating processes and data flows by which the localization tools may enable localization vendors to build products or applications for testing localized resources.

DETAILED DESCRIPTION

Figure 1:
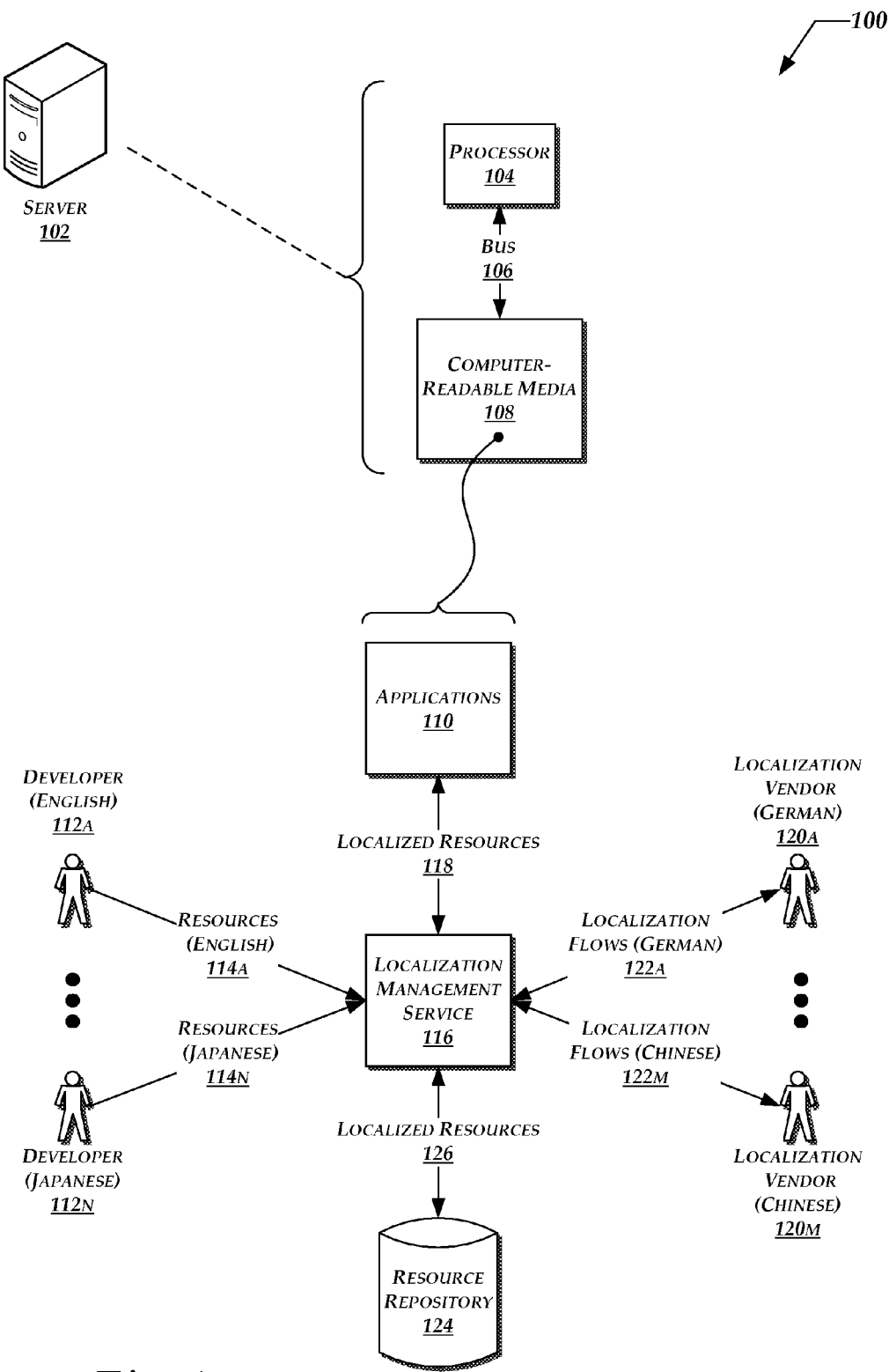
FIG. 1 is a combined block and flow diagram illustrating systems or environments in which repositories and related services for managing localization of resources may operate.

The following detailed description is directed to technologies for repositories and related services for managing localization. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for repositories and related services for managing localization will be described.

FIG. 1 illustrates systems or operating environments, denoted generally at 100, in which repositories and related services for managing localization may operate. These systems 100 may include one or more server systems 102, with FIG. 1 illustrates one server system 102 only for clarity of illustration. However, implementations of the description herein may include any number of server systems.

The graphical elements used in FIG. 1 to depict the server systems are chosen only to facilitate illustration, and not to limit possible implementations of the description herein. More particularly, FIG. 1 shows examples in which the server system 102 is a centralized computing system, possibly shared by more than one client system. However, the server systems 102 may also represent one or more desktop systems without departing from the scope and spirit of this description. Thus, the description herein also contemplates other forms of server systems, including but not limited to, those shown in FIG. 1.

Turning to the servers 102 in more detail, the servers may include one or more processors 104, which may have a particular type or architecture, chosen as appropriate for particular implementations. The processors 104 may couple to one or more bus systems 106 chosen for compatibility with the processors 104.

The servers 102 may also include one or more instances of computer-readable storage media 108, which couple to the bus systems 106. The bus systems may enable the processors 104 to read code and/or data to/from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

The storage media 108 may include one or more modules of software instructions that, when loaded into the processor 104 and executed, cause the server 102 to perform various techniques related to operating and/or maintaining the repositories and related services for managing localization. As detailed throughout this description, these servers 102 may manage the localization services using the components and flows now described in connection with FIG. 1.

The computer-readable media 108 may include one or more applications or software products, denoted generally at 110. These applications may incorporate or operate with various textual information, strings, or other label-type elements, referred to generally in this description as resources. Examples of these resources may include, but are not limited to, labels or strings appearing in various user interface (UI) elements, dialog boxes, error messages, or the like. The content of these resources may determine, for example, the content of error messages that are presented to users when the applications are running.

FIG. 1 illustrates different developers who may author the various resources used by the applications 110. FIG. 1 illustrates developers 112a and 112n (collectively, developers 112), who may respectively author resources 114a and 114n (collectively, resources 114) to be included in one or more of the applications. For example only, the developer 112a may author the resources 114a primarily in the English language, while the developer 114n may author the resources 114n primarily in the Japanese language. The examples of languages as chosen herein are provided only for example, and do not limit possible implementations. In addition, the two developers shown in FIG. 1 are illustrative only, and the operating environments 100 may support any number of developers.

The applications 110 may be made available to a variety of different users speaking a variety of different human languages. As appreciated from the foregoing, the resources 114 are typically specific to particular human languages. More specifically, the resources 114 may be localized or translated, from the language in which they were originally authored to any number of destination or target human languages. The computer-readable media 108 may include software modules 116 that, when executed by the processor 104 manages the localization of the resources 114 into localized resources 118. Once the localized resources 118 are available, the applications 110 may incorporate these localized resources, as appropriate for any number of different human languages in which the applications are marketed.

The localization management service 116 may coordinate and administer efforts of a variety of different vendors to localize the resources into any number of target human languages. FIG. 1 provides examples of localization vendors 120a and 120m (collectively, localization vendors 120). In the non-limiting examples shown in FIG. 1, the localization vendor 120a localizes the resources into German, and the localization vendor 120m localizes the resources into Chinese. The two localization vendors 120 are chosen only for example, and the operating environments 100 may support any number of localization vendors.

FIG. 1 also illustrates localization flows 122a and 122m (collectively, localization flows 122) associated respectively with the vendors 120a and 120m. Generally, these localization flows 122 may represent requests to localize particular resources, the localized resources provided in response to those requests, as well as any related message or process flows related to these localizations.

Once the localized resources 118 are available from the various vendors 120, the localization management service 116 may store these localized resources into a unified resource repository 124. The term "unified" may refer to a common format applicable to all resources stored in the repository 124. FIG. 1 denotes the localized resources as stored in this repository at 126. The localization management service 116 may also retrieve the localized resources 126 from the repository 124 as appropriate to build any number of localized applications 110.

Only for clarity of illustration and description, but not to limit possible implementations, FIG. 1 illustrates examples in which the storage medium 108 contains the applications 110, the localization management service 116, and the resource repository 124. However, implementations of this description may store the applications, management service, and resource repository in the same or different media without departing from the scope and spirit of this description.

Having described the overall covering environments or systems in FIG. 1, the discussion now turns to a more detailed description of the localization management service and related resource repository. This description is now provided with FIG. 2.

Figure 2:
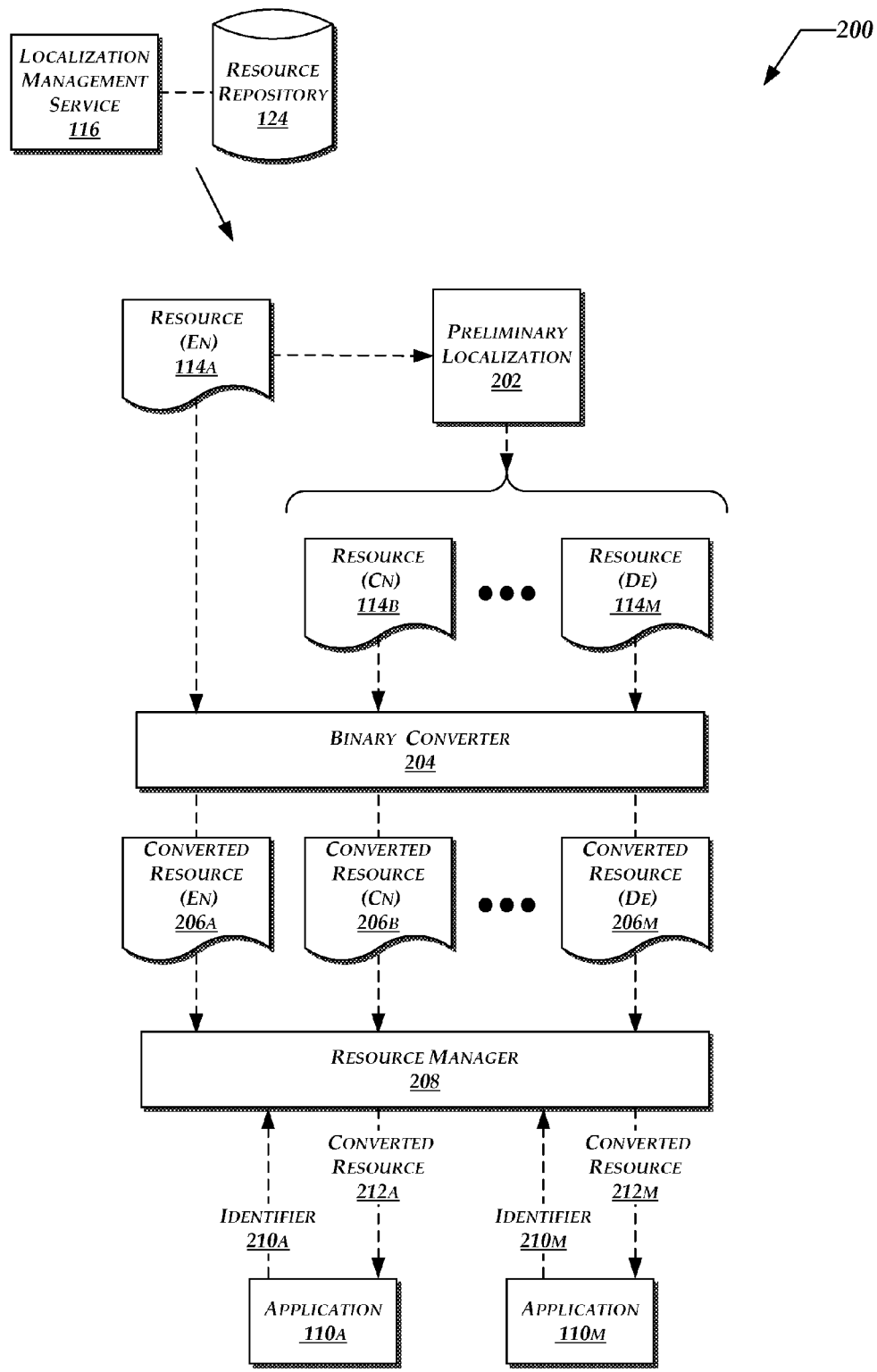
FIG. 2 is a combined block and flow diagram illustrating components and process flows relating to the localization management service and related resource repository.

FIG. 2 illustrates components and process flows, denoted generally at 200, that provide additional details on the operations of the localization management service and related resource repository. To facilitate description, but not to limit possible implementations, FIG. 2 may carry forward some drawing elements from previous figures, and denote them with identical reference numbers. For example, FIG. 2 carries forward an example localization management service at 116 and an example resource repository at 124.

Turning to FIG. 2 in more detail, the localization management service 116 may include a preliminary translation module 202 that operates to receive resources (e.g., carried forward as resources 114a) authored initially in a given language (e.g., English). The translation module may then preliminarily or initially localize these resources into any number of target languages. This preliminary localization may represent a "first cut" at localizing the given resource, for purposes of testing or verifying the operation of applications that may include a localized resource. More specifically, these preliminary localizations may enable the localization management service to test the applications at build time using the preliminary localizations, rather than later at runtime. This initial testing may take the form of operational dry runs or other forms of preliminary testing.

As examples of these preliminary localizations, in some cases resource strings may have been previously localized, and are thus available for reuse or recycling. In another example, the preliminary translation module 202 may use machine or automated translation to preliminarily or initially localize the input resource. Even though such machine or automated translations may not be perfectly accurate, they may still represent a suitable starting point for the localization process, and may provide a sufficient basis for preliminary testing. In yet another example, the preliminary translation module may use random code points, which provide a type mapping between different languages.

In the example shown in FIG. 2, the preliminary translation module 202 may localize the English resource 114a into Chinese (e.g., 114b), German (e.g., 114m), or other suitable languages. In turn, a binary conversion module 204 may receive the English resource 114a, and any preliminarily localized resources (e.g., 114b and 114m) as input. The module 204 may convert these resources, expressed in any suitable unified format across a plurality of different applications, into compressed, binary representations of converted resources. FIG. 2 illustrates examples in which the resources 114a, 114b, and 114m are converted into respective resources 206a, 206b, and 206m (collectively, converted resources 206). These converted resources 206 may be localized, in the sense that the example resource 206a may be in English, the example resource 206b may be in Chinese, and the example resource 206m may be in German.

In example implementations, the converted resources 206 may be .dll (dynamically linked library) files. However, it is noted that implementations of this description may use other examples of converted representations.

A resource manager 208 may receive and store the various converted resources 206. In the example shown in FIG. 2, various applications may request the converted resources 206 (e.g., .dll files) from the resource manager 208. For example, the various converted resources 206 may be associated with corresponding unique identifiers 210, enabling the applications to request particular converted resources using the unique identifiers. FIG. 2 provides an example in which an application 110a requests the converted resource 206a using a first identifier 210a associated with the resource 206a, and in which a second application 110m requests the converted resource 206m using a second identifier 210m associated with the resource 206m. FIG. 2 denotes at 212a the converted resource as provided to the application 110a, and denotes at 212m the converted resource as provided to the application 110m.

Having described in FIG. 2 components and flows for preliminary localization of resources, the discussion now turns to a description of components and flows by which localization vendors may localize the resources at build time. This discussion is now presented with FIG. 3.

Figure 3:
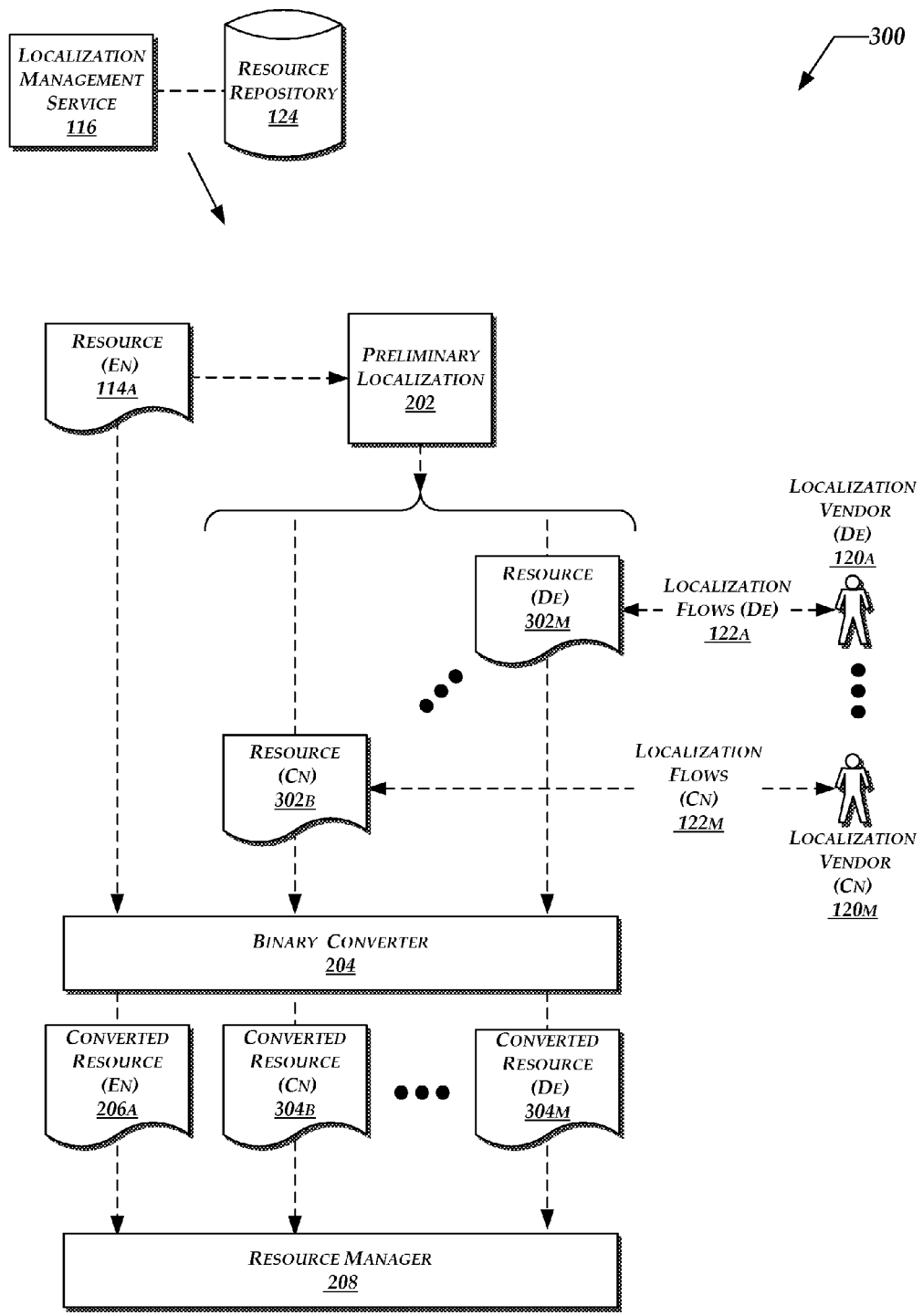
FIG. 3 is a combined block and flow diagram illustrating components and process flows by which localization vendors may localize the resources at build time.

FIG. 3 illustrates components and process flows, denoted generally at 300, by which localization vendors may localize the resources at build time. To facilitate description, but not to limit possible implementations, FIG. 3 may carry forward some drawing elements from previous figures, and denote them with identical reference numbers. For example, FIG. 3 carries forward an example localization management service at 116 and an example resource repository at 124. FIG. 3 also carries forward the example English-language resource 114a, as well as the example Chinese-language and German-language resources 114b and 114m, as preliminarily localized by the localization module 202.

Turning to FIG. 3 in more detail, a localization vendor (e.g., 120a) may obtain the initially-localized German-language resource 114m, as shown in FIG. 2, and more completely localize this resource. For example, the localization vendor 120a may review the preliminary localization, and adjust or correct it as appropriate. FIG. 3 denotes these localization flows generally at 122a, resulting in an updated and finally-localized German-language resource 302m. In a similar manner, an example Chinese-language localization vendor 120m may obtain and perform final localization on the initially-localized Chinese-language resource 114b, resulting in the finally-localized resource 302b. These localization flows are denoted generally at 122m.

FIG. 3 carries forward the binary converter 204, which as described above may convert the English-language resource 114a into a converted resource 206a. In addition, the binary converter may process the finally-localized Chinese-language and German-language resources 114b and 114m, resulting in updated versions of the converted resources 212a and 212m, which were shown in FIG. 2. FIG. 3 denotes these updated resources at 304b and 304m.

Continuing the example described above in FIG. 2, in which the converted resources 206 are .dll files, the resources 304b and 304m may be updated to incorporate final localizations made by the vendors 120a and 120m. In turn, the resource manager 208 may make these of resources 206a, 304b, and 304m available on request to various applications (e.g., 110 in FIGS. 1 and 2).

Having described the above components and flows in FIGS. 2 and 3, several observations are noted. The localization management service enables the localization vendors to localize resources before they are converted into binaries that are built into applications, rather than after they are built into applications. In this manner, the localization management service enables resource authoring and development to proceed in parallel in several different languages. In addition, applications and/or products that are localized for a variety of different languages and may be built in parallel using the tools and techniques described herein. For example, converted binary resources authored originally in English (e.g., 206a) may be made available to the resource manager 208 when the applications are built, generally in parallel with the corresponding localized resources (e.g., 304b and 304m).

Having described the components and flows and FIG. 3, the discussion now proceeds to a description of a model or hierarchy for the resource repository. This discussion is now presented with FIG. 4.

Figure 4:
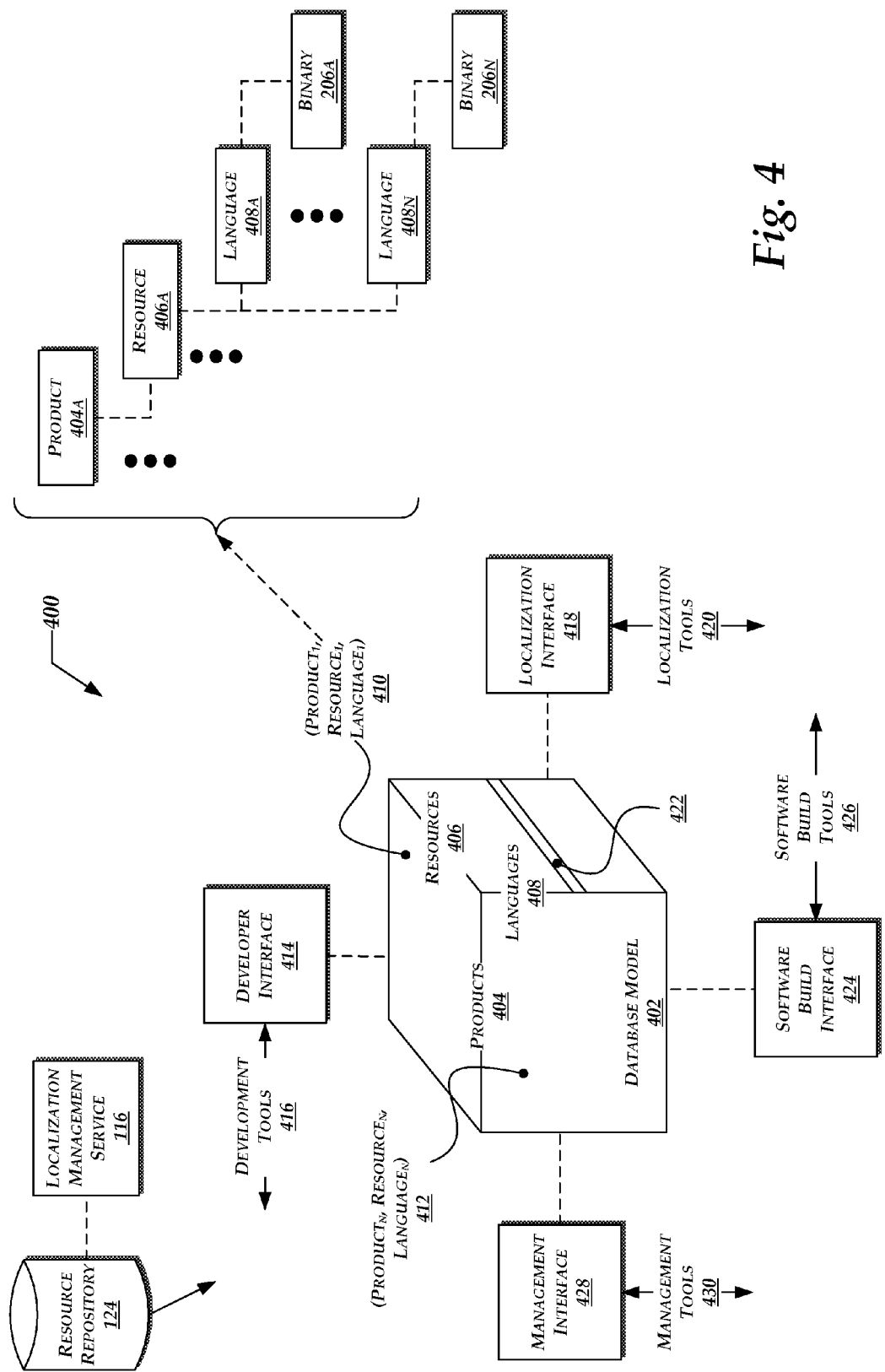
FIG. 4 is a database diagram illustrating models or hierarchies for the resource repository.

FIG. 4 illustrates models or hierarchies, denoted generally at 400, for the resource repository. To facilitate description, but not to limit possible implementations, FIG. 4 may carry forward some drawing elements from previous figures, and denote them with identical reference numbers. For example, FIG. 4 carries forward an example localization management service at 116 and an example resource repository at 124.

Turning to FIG. 4 in more detail, the resource repository 124 may be implemented using a database model and related data structures, represented generally at 402. This model may arrange or organize along a first axis 404 representations of applications or software products (e.g., 110 in FIGS. 1 and 2). This model may also arrange or organize along a second axis 406 representations of resources available for these applications, and may arrange or organize along a third axis 408 representations of languages available for these applications and/or resources. In this manner, the database model 402 may conceptually provide a type of three-dimensional hierarchical scheme that relates or links the representations of the products, languages, and resources to one another. For example, as represented generally at 410, a given product may include one or more resources that are localized in a first given language. As represented generally at 412, a second given product may include one or more resources that are localized in a second given language. It is noted that the database model 402 may be generalized to incorporate and organize representations of any number of products, languages, and resources, with the example shown in FIG. 4 being illustrative rather than limiting.

In an example hierarchy shown in FIG. 4, elaborating further on the relationships noted at 410, a representation of a given application or software product 404a may be associated with representations of one or more localizable resources 406a, which may be associated with globally unique identifiers (GUIDs) (e.g., 210) as discussed above in FIG. 2. More specifically, the localizable resources may be associated with respective GUIDs, regardless of where these resources lie in the three-dimensional hierarchy shown in FIG. 4. In this manner, the hierarchy may enable external interfaces or tools to address and retrieve resources individually and uniquely, regardless of the language into which the resources are localized, and regardless of which products incorporate these resources. In turn, the resources 406a may be localized into one or more additional human languages, with two example representations provided at 408*a* and 408*n*. Finally, a representation of the localized resource 408*a* may be associated with a corresponding converted or binary representation of the resource, carried forward at 206*a*. Similarly, a representation of the localized resource 408*n* may be associated with a corresponding light binary 206*n*.

In elaborating on the relationships shown at 410, it is noted that such relationships may be extended across any number of software products or applications. Further, these hierarchies may establish any number of different relationships between the products, resources, and/or languages for localizing resources for incorporation into different products. For example, a given resource may be incorporated into a variety of different products or applications, and the resource may be localized into any number of different target human languages.

The localization management service 116 may cooperate with the resource repository 124 to define a set of tools or interfaces that enable a variety of different entities to interact with the resource repository. For example, the localization management service 116 may provide a developer interface 414 that exposes a set of tools 416 to development personnel (e.g., 112 and FIG. 1). These tools may enable developers to author resources (e.g., text strings) in a variety of different languages. These development tools may also store the resources appropriately within the data base model.

A localization interface 418 may expose a set of localization tools 420 to, for example, one or more localization vendors (e.g., 120 in FIG. 1). As described elsewhere herein, different vendors may localize resources into different languages. Accordingly, the localization tools 420 may expose different "slices" of the database model 402 to different localization vendors, depending on the languages in which the vendors operate. FIG. 4 provides an example of such a slice at 422, which may represent German-language products and resources that are provided to a localization vendor operating in German.

The localization tools 420 may provide for converting formats, as appropriate, between those used to implement the resource repository 124 and those used internally by localization vendors. In some instances, however, the localization tools 420 may enable the localization vendors to access the resource repository directly, without converting formats. In this manner, the localization tools may provide an online service by which the vendors may directly localize the resources in the repository.

A software build interface 424 may expose a set of software build tools 426 to, for example, produce or build software products. More specifically, these software build tools may enable a build lab to produce a given software product that incorporates a set of resources that are localized to a particular language. FIG. 4 provides examples, denoted at 410 and 412, that illustrate relationships between a given product, the particular resources included in that product, and the languages for which the resources are localized.

In the example database model 402, a process for building particular product may be visualized as "drilling" through the two-dimensional plane formed by the product axis 404 and the language axis 408 in parallel with the resource axis 406. In this visual example, the build process may "drill" into the appropriate point in the product-language plane, depending on the target product and the target language. As the build process proceeds or "drills" along the resource axis 406, the build process may incorporate the appropriate resources for building a product, with these resources localized into the target language appropriate for the product.

In example implementations, the various elements stored in the resource repository may be implemented in XML. The software build tools 426 may include binary converters (e.g., 204 in FIG. 2) to convert these elements into, for example, .dll files or other equivalent representations.

A management interface 428 may expose a set of management tools 430 to, for example, program managers involved with particular products and/or resources. These management tools 430 may enable the program managers to view a set of resources across one or more particular products. In this manner, the management tools 430 may enable the program managers to identify any redundancy or duplication appearing in different resources in different products. For example, a given error message may appear in slightly different forms in two or more different products. The management tools 430 may enable a program manager to identify the slightly different forms for this error message, resolve any inconsistencies in this message across the different products, and update the resource for this error message accordingly.

The localization management service 116 and the resource repository 124 may cooperate to manage the database model 402 as operations proceed over time. For example, resource developers may continually provide new text strings through the developer interface 414 and related development tools 416. As these new text strings or resources arrive in the repository, the localization management service may preliminarily translate or localize these new strings into any number of target languages. FIGS. 2 and 3 provide examples of preliminary localization modules at 202. In this manner, preliminary or initial localizations of the new text string may propagate through the database model 402 along the language axis 408. In turn, as these preliminary localizations become available in different languages, the localization interface 418 and related tools 420 may expose these preliminary localizations to the appropriate vendors who operate in those different languages. As described above, these vendors may review these preliminary localizations, and finalize as appropriate.

In example implementations, the various elements stored in the resource repository may be implemented in XML. The software build tools 426 may include binary converters (e.g., 204 in FIG. 2) to convert these elements into, for example, .dll files or other equivalent representations. In some cases, the software build tools 426 and the localization tools 420 may cooperate, to enable localization vendors to build software products that incorporate resources that were finally-localized by the vendors. More specifically, the localization vendors may be able to generate .dll files for the localized resources, link these .dll files into built products, and run the products to view the results of the localization. In this manner, the localization vendors may test and verify their localizations, as well as testing the operation of the built product when operating with the localized resources.

Assuming that the resource repository is implemented in XML, the various interfaces and tools described in FIG. 4 may enable various entities or processes to interact with the resource repository without programming in XML. More generally, the various interfaces and tools may serve to isolate external entities or processes from the implementations details of the resource repository. In addition, it is noted that FIG. 4 provides various examples of interfaces or tools to facilitate this description. However, these examples of interfaces or tools are non-limiting, and implementations of this description may provide other interfaces or tools as well.

In some implementations, the product builds, as presented to the localization vendors, may enable the vendors to hover a user interface device (e.g., a mouse pointer) over a particular non-localized string, or over a preliminarily-localized string appearing within the running product. The localization tools 420 may present a suitable user interface, responsive to input from vendor personnel to finally localize the string. Once the string is localized finally, the localization tools 420 may propagate the localized resource back to the resource repository.

In addition, finalized and shipped product builds may be presented to end-users, along with suitable tools enabling these end-users to localize or translate UI resources presented when these product builds are executed. More specifically, such end-user localization tools may enable the end-users to access the resource repository, whether sent or shipped with the product build directly to the end-users, or whether the end-users are given some mechanisms for accessing the repository. Such mechanisms may include web services by which the users may access the repository, with the repository not being physically shipped or sent with the build product. In these different scenarios, the repository may be provided in a "binary" form, and in these scenarios, conversion to binary may be optional in a sense. given access to the repository, the end-users may perform a form of "do it yourself" runtime localization on their own build of the product.

Enabling the end-users to access the resource repository may enable uses other than run-time localization. For example, end users may look up resources at run time, if they have access to the resource repository. As described elsewhere herein, most resource loads may be based on knowing the unique identifier associated with a particular resource, and loading the resource based on this identifier. However, in some cases identifier-based lookups may fail, for example, if a given resource with a given unique identifier is not yet been translated or localized. In this case, the resource repository could provide a string-based lookup mechanism to locate the resource, in addition to identifier-based lookups.

The database model 402 and related services and tools may readily be extended to handle not only languages, but also language dialects spoken within particular regions or communities. For example, the localization tools 420 may enable dialect localizers (who may or may not be localization vendors) who speak a particular dialect to add layers to the database model 402. These additional layers may localize resources from broader languages to particular dialects. Samples of these dialects may include, but are not limited to, the various dialects spoken in China, Native American languages, or the like.

In some instances, these layers added to the database model may be isolated from the rest of the database model, thereby enabling these dialect localizers to operate within these additional layers without affecting or impacting the rest of the database model. For example, the rest of the database model may be designated as "read-only" to these dialect localizers.

Having described the models or hierarchies for the resource repository in FIG. 4, the discussion now turns to a description of process flows for managing the localization of resources. This description is now presented with FIG. 5.

Figure 5:
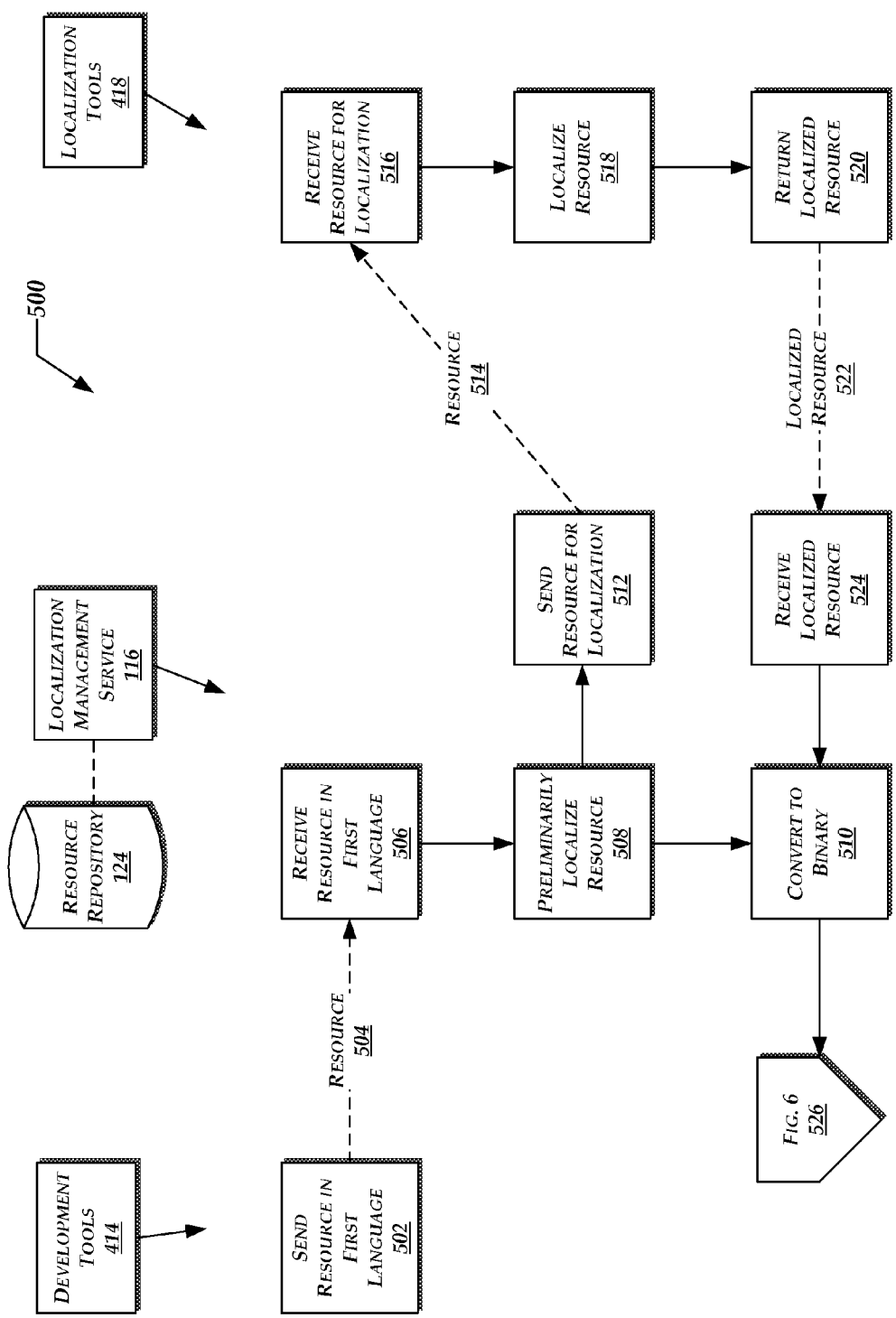
FIG. 5 is a diagram illustrating processes and data flows for managing the localization of resources.

FIG. 5 illustrates process and data flows, denoted generally at 500, for managing the localization of resources. To facilitate description, but not to limit possible implementations, FIG. 5 may carry forward some elements from previous figures, and denote them with identical reference numbers. For example, FIG. 5 carries forward examples of development tools at 414, examples of a localization management service (e.g., 116) cooperating with a resource repository (e.g., 124), and examples of localization tools at 418.

In addition, FIG. 5 arranges certain processes and data flows in columns, corresponding to illustrative entities that may perform such processes and data flows, only for the purposes of this description. However, it is noted that these arrangements are provided for example only, and not to limit possible implementations. More specifically, entities other than those shown in FIG. 5 may perform some or all of these processes or data flows.

Turning to FIG. 5 in more detail, block 502 represents sending a resource authored in a first given language. For example, block 502 may include the development tools 414 providing text strings authored by development personnel (e.g., 112 in FIG. 1). FIG. 5 denotes these authored resources at 504, which collectively represents the various resources shown in FIG. 1 (e.g., 114a and 114n).

Block 506 represents receiving the authored resource in a first language. In the example shown in FIG. 5, block 506 may include the localization management service receiving the resource.

Block 508 generally represents preliminarily localizing the resource received in block 506. For example, the preliminary localization module 202, shown in FIG. 2, may perform block 508.

Block 510 may convert the preliminary localizations to a binary form (e.g., .dll files). In parallel with blocks 508 and 510, block 512 represents sending the resource for final localization. For example, block 512 may include sending the resources to one or more appropriate localization vendors, via the localization tools 418. FIG. 5 denotes at 514 the resources as sent for localization. More specifically, block 512 may include providing the input resource 514 to the localization vendor before the resource is compiled into a binary form. In this manner, the localization vendor may translate the resource before it is incorporated into a built, executable product. Accordingly, the localization vendor and related services are moved upstream in the software development process, as compared to previous techniques.

It is noted that block 512 may include sending the input resource 514 to multiple localization vendors, to be localized into multiple different target languages. FIG. 5 illustrates one instance of localization tools only for clarity of illustration.

Turning to the localization tools, block 516 generally represents receiving the resource for localization. In different possible scenarios, block 516 may include receiving resources that are preliminarily localized, or may include receiving resources that are non-localized.

Block 518 represents localizing the input resource 514. In some scenarios, multiple different localization vendors may respectively perform block 518 on a given input resource, to localize the input resource into several different target languages. Block 518 may include performing a final localization on the input resource.

Block 520 represents the localization tools returning the localized resource to the localization management service. FIG. 5 denotes the localized resource at 522. As noted elsewhere in this description, a plurality of different localization tools 418 may provide different instances of the resources 522, localized for different target languages.

Block 524 represents receiving one or more instances of resources 522, localized for one or more target languages. Afterwards, block 510 may convert the localized resources into binary form (e.g., .dll files). In instances where resources are initially or preliminarily localized and then converted to binary, block 510 may include updating the binary representation of such resources, after these resources have been finally localized.

Figure 6:
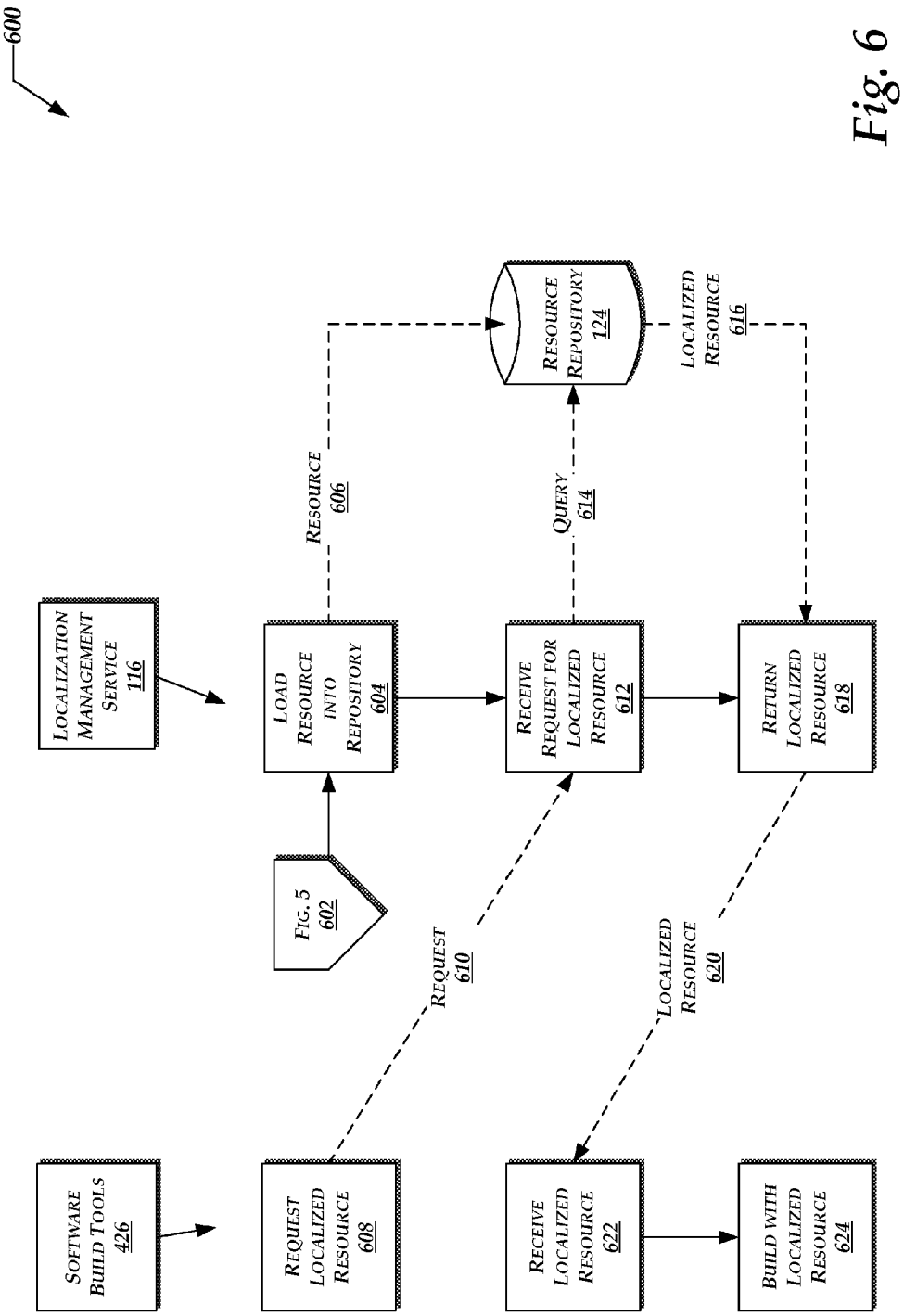
FIG. 6 is a diagram illustrating continuations of the process and data flows from FIG. 5.

For clarity of illustration and description, but not to limit possible implementations, the description of the process flows 500 now proceeds to FIG. 6 via off-page reference 526. The discussion now continues with FIG. 6.

FIG. 6 illustrates continuations, denoted generally at 600, of the process and data flows from FIG. 5. To facilitate description, but not to limit possible implementations, FIG. 6 may carry forward some drawing elements from previous figures, and denote them with identical reference numbers. For example, FIG. 6 carries forward an example localization management service at 116, an example resource repository at 124, and example software build tools at 426.

Beginning at off-page reference 602 from FIG. 5, block 604 generally represents loading a resource 606 into the repository. In different scenarios, the resource 606 loaded into the repository may be non-localized, preliminarily localized, or finally localized.

Turning to the software build tools 426, block 608 generally represents requesting one or more resources for building a given software product or application, localized for a particular target language. These resources may be converted or binary resources (e.g., .dll files), and the requests may reference unique identifiers associated with these converted resources (e.g., 210 in FIG. 2). FIG. 6 denotes such requests for localized resources at 610.

At the localization management service, block 612 generally represents receiving the request for localized resources. Block 612 may also include querying the resource repository with any identifiers associated with the requested resource, as denoted generally at 614.

Assuming that the resource repository contains converted, localized resources 616 responsive to the query 614, block 618 generally represents returning the localized resources. FIG. 6 denotes the returned localized resources generally at 620.

Turning to the software build tools 426, block 622 generally represents receiving the localized resources in response to the request 610. In turn, block 624 generally represents building the application, incorporating the localized resources 620, as built into and obtained from the resource repository 124. The resource repository provides the ability to build and/or generate for any human language for which resources are available dynamically. In the scenarios described herein, the English language is treated as just another language, in contrast to previous approaches in which development occurred initially and primarily in English, with other languages being localized after-the-fact. When block 622 generates/builds for a given language, the resource manager (e.g., 208 in FIG. 2) uses metadata stored in a resource repository to represent the user interface resources with which the product is built, without affecting the functionality of the product.

Having described the process and data flows shown in FIGS. 5 and 6, the discussion now turns to descriptions of additional processes and data flows by which the localization tools may enable localization vendors to build products or applications for testing localized resources. This description is now presented with FIG. 7.

FIG. 7 illustrates processes and data flows, denoted generally at 700, by which the localization tools may enable localization vendors to build products or applications for testing localized resources. To facilitate description, but not to limit possible implementations, FIG. 7 may carry forward some drawing elements from previous figures, and denote them with identical reference numbers. For example, FIG. 7 carries forward an example localization management service at 116, an example resource repository at 124, and example localization tools at 418.

Turning to FIG. 7 in more detail, block 702 represents providing a resource 704 from the resource repository 124. In the example shown in FIG. 7, the localization management service 116 may perform block 702. As described elsewhere herein, this resource may have been non-localized, or in some cases preliminarily-localized. To represent these different scenarios, FIG. 7 denotes the resource at 706.

Turning to the localization tools 418, block 708 generally represents receiving the resource (whether non-localized, or localized preliminarily) from the localization management service. In turn, block 710 represents finally localizing the resource, as may be performed by a localization vendor using the localization tools 418.

Block 712 represents building a software product to incorporate the localized resource. Block 712 may include converting the localized resource into appropriate binary form (e.g., .dll files) for incorporation or linking into the software product. For example, the localization tools 418 may include a binary converter (e.g., 204 in FIG. 2) for performing this conversion.

Block 714 generally represents executing the software product built in block 712 to test the localized resource is incorporated into that software product. Put differently, block 714 may include testing whether the software product executes appropriately with the localized resource, as represented in decision block 716.

From decision block 716, if the testing indicates that the software build does not execute appropriately with the localized resource, then the process flows 700 may take No branch 718 to return to block 710. In this scenario, block 710 may include applying a different localization to the resource, and repeating blocks 712, 714, and 716 with the newly-localized resource. In this manner, the process flows 700 may loop through block 716, 710, 712, and 714 until the software executes appropriately with the localized resource.

Returning to decision block 716, if the testing indicates that the software build executes appropriately with the localized resource, then the process flows 700 may take Yes branch 720 to block 722. Block 722 generally represents returning the localized resource, denoted at 724, to the localization management service.

At the localization management service, block 726 represents receiving the localized resource 724. In turn, block 728 represents loading the localized resource (denoted at 730) into the resource repository 124.

Having provided the preceding description, several observations are now noted. To facilitate description, some of the drawing figures illustrate data and/or process flows represented by unidirectional arrows. However, it is noted that these unidirectional representations do not exclude implementations having bidirectional data and/or process flows. in addition, certain processes and/or data flows are shown herein in particular orders chosen only for convenience and description, but not to limit possible implementations Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the following claims.

What is claimed is:

1. An apparatus comprising:
a computer processor; and
a memory connected to the computer processor for executing at least one data structure encoded in a computer readable storage medium, wherein the at least one data structure being executed by the computer processor to provide:
a representation of at least one resource provided in a first human language;
a representation of at least one second human language into which the resource is preliminarily localized at a first time;
at least one representation of a binary version of the preliminary-localized resource as preliminarily-localized into the second human language, wherein the binary version of the resource is a first dynamically linked library ("DLL") file;
a representation of a software product that incorporates the binary version of the preliminary-localized resource as preliminarily-localized into the second human language;
a unique identifier corresponding to the binary version of the preliminary-localized resource that enables a requesting application to be provided with the binary version of the preliminary-localized resource;
a software build interface exposing a set of software build tools that incorporates the binary version of the preliminary-localized resource into the requesting application;
a further representation of the at least one second human language where the preliminarily localized resource is one of adjusted and corrected at a second time to produce a finally-localized resource, wherein the representation of the finally-localized resource is related to the representation of the software product and to the representation of the second human language; and
at least one representation of a binary version of the finally-localized resource as finally localized into the second human language, wherein the binary version of the resource is a second DLL file.

2. The apparatus of claim 1, wherein the representation of the resource is a representation of a text string.

3. The apparatus of claim 1, wherein the at least one data structure being executed to further provide a representation of at least a further resource, wherein the representation of the further resource is related to the representation of the software product to indicate that the software product may incorporate the further resource, and further comprising a representation of at least one human language into which the further resource is localized.

4. The apparatus of claim 1, wherein the at least one data structure being executed to further provide a representation of at least a further human language into which the resource is localized.

5. The apparatus of claim 1, wherein the at least one data structure being executed to further provide a representation of at least a dialect of the second human language into which the resource is localized.

6. The apparatus of claim 5, wherein the representation of the dialect is isolated from the rest of the data structure.

7. The computer readable storage medium of claim 1, wherein the resource is preliminarily localized by providing one of:
one of a machine and an automated translation of the at least one resource provided in the first human language into the representation of the at least one second human language; and
random code points that provide a mapping between the first human language and the at least one second human language.

8. An apparatus comprising:
a computer processor; and
a memory connected to the computer processor for executing computer-executable instructions stored on at least one computer-readable storage medium that, when executed by the computer processor, cause the computer processor to perform a method comprising:
receiving at least one resource provided in a first human language;
sending the resource for preliminary localization at a first time into at least one second human language;
converting the preliminary localization resource into a binary representation of the preliminary localization resource comprising a first dynamically linked library file;
receiving a unique identifier corresponding to the preliminary-localized resource from a requesting application;
building at least one software product that links the binary representation of the preliminary localization resource into the requesting application;
executing the requesting application with the binary representation of the preliminary-localized resource;
receiving instructions to one of adjust and correct the preliminary localization of the resource at a second time to create a finalized localization of the resource;
receiving the finalized localization of the resource;
converting at least the finalized localization resource into a binary representation comprising a second dynamically linked library file; and
building the at least one software product that links at least the binary representation of the finalized localization resource comprising the dynamically linked library file.

9. The apparatus of claim 8, wherein the computer processor further performs the method comprising storing the localized version of the resource into a resource repository.

10. The apparatus of claim 8, wherein building the at least one software product further includes building a first version of the at least one software product in the first human language in parallel with building at least a second version of the at least one software product localized to the second human language.

11. The apparatus of claim 8, wherein building the at least one software product further includes building a first version of the at least one software product in the first human language, and wherein sending the resource for localization are performed before building the first version of the at least one software product.

12. The apparatus of claim 8, wherein the computer processor further performs the method comprising exposing a set of developer tools for authoring and receiving the resource, a set of software build tools for building the at least one software product, a set of management tools for accessing representations of the resource, and a set of localization tools for localizing the resource.

13. The computer-readable storage medium of claim 8, wherein sending the resource for preliminary localization into at least one second human language further comprises providing one of:
one of a machine and an automated translation of the at least one resource provided in the first human language into the representation of the at least one second human language; and random code points that provide a mapping between the first human language and the at least one second human language.

14. A system comprising:
at least one processor coupled to communicate via at least one bus system; and
at least one computer-readable storage medium coupled to communicate through the bus system, wherein the storage medium includes at least a resource repository, wherein the resource repository further comprises
a representation of at least one resource provided in a first human language,
a representation of a software product that may incorporate at least the resource, and
a representation of at least one second human language into which the resource is preliminarily localized at a first time,
at least one representation of a binary version of the preliminary-localized resource as preliminarily-localized into the second human language, wherein the binary version of the resource is a first dynamically linked library ("DLL") file;
a representation of at least one software product that incorporates the binary version of the preliminary-localized resource as preliminarily-localized into the second human language;
a further representation of the at least one second human language where the preliminarily localized resource is one of adjusted and corrected at a second time to produce a finally-localized resource,
wherein the representation of the finally-localized resource is related to the representation of the at least one software product and to the representation of the second human language,
wherein the storage medium further includes computer-executable instructions that, when executed by the processor, cause the processor to
receive said at least one resource provided in the first human language,
send the resource for preliminary localization at the first time into at least one second human language,
convert the preliminary localization resource into a binary representation of the preliminary localization resource comprising the first dynamically linked library file;
receive a unique identifier corresponding to the binary version of the preliminary-localized resource from a requesting application;
build at least one software product that links the binary representation of the preliminary localization resource into the requesting application;
execute the requesting application with the binary representation of the preliminary-localized resource;
receiving instructions to one of adjust and correct the preliminary localization of the resource at the second time to create a finalized localization of the resource,
receive the finalized localization of the resource,
convert at least the finalized localization resource into a binary representation comprising a second dynamically linked library file, and
build the at least one software product by linking at least the binary representation of the finalized localization resource comprising the second dynamically linked library file.

15. The system of claim 14, wherein the storage medium includes computer-executable instructions that, when executed by the processor, cause the processor to manage localizing the resource into at least the second human language.

16. The system of claim 15, further comprising a binary converter for converting the localized resource into a binary representation, and for associating a unique identifier with the localized resource.

17. The system of claim 16, further comprising a resource manager operative to receive requests that include unique identifiers associated with the converted resources, and to provide the converted resources in response to the requests.

18. The system of claim 14, wherein the resource is preliminarily localized by providing one of:
one of a machine and an automated translation of the at least one resource provided in the first human language into the representation of the at least one second human language; and
random code points that provide a mapping between the first human language and the at least one second human language.

* * * * *